Nov. 4, 1924.

J. J. LA DUCER 1,514,539

VERTICAL SPINDLE MILLING MACHINE

Filed April 29, 1920

INVENTOR
J. J. LaDucer
BY S. Jay Teller
ATTORNEY

Patented Nov. 4, 1924.

1,514,539

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

VERTICAL-SPINDLE MILLING MACHINE.

Application filed April 29, 1920. Serial No. 377,725.

*To all whom it may concern:*

Be it known that I, JERRY J. LA DUCER, a citizen of the United States, residing at Hartford, in the county of Hartford and State of Connecticut, have invented certain new and useful Improvements in Vertical-Spindle Milling Machines, of which the following is a specification.

This invention relates to milling machines, particularly of the vertical spindle type, and it is an object of the invention to provide such a machine of an improved and more substantial character.

It is an object of the invention to provide a vertical spindle milling machine having tool-supporting means comprising uprights preferably integrally connected and adjustably mounted on ways on the base, a cutter-supporting rail also preferably being provided and vertically adjustably mounted on the uprights.

A further object of the invention is to provide a mechanism comprising a plurality of different sized spindles adapted to be concentrically mounted in such manner that a spindle conforming to the size and character of the work to be performed may be readily mounted and operated in the same machine.

Another object of the invention is to provide a spindle mechanism comprising an outer cutter spindle and an inner cutter spindle, the latter being removable and the outer spindle being adapted to receive a cutting tool therein in place of the inner spindle.

It is an object of the invention to provide a two spindle mechanism as above described and means for rotating the spindles at different speeds respectively.

It is also an object of the invention to provide a spindle mechanism comprising an outer spindle and an inner spindle each adapted to receive a cutting tool and common means for driving the outer and inner spindles at low and high speeds respectively, the inner spindle and its operating parts being readily removable.

Other objects of the invention will appear as the description proceeds.

Referring to the drawing.

Figure 1:
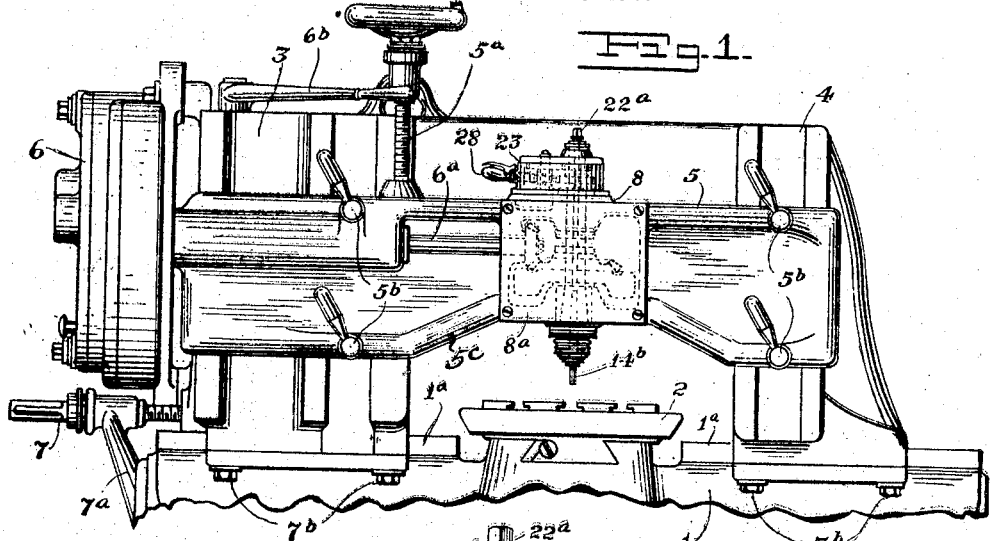
Figure 1 is a front elevation of a portion of a milling machine comprising the present invention.

Referring more specifically to the drawing by reference characters, 1 indicates the base of a milling machine having a work table 2 slidably mounted thereon. The construction of the table and its operating mechanism is preferably of the type illustrated and described in Patent No. 1,231,255 to B. M. W. Hanson, the work table, however, being preferably of the drop-table type such as illustrated in Patent No. 1,187,730 to B. M. W. Hanson. This specific construction, however, comprises within itself no part of the present invention and therefore will not be further described herein.

Adjustably mounted on the ways $1^a$ of the base 1 are two uprights 3 and 4 and in order to secure the maximum rigidity and strength to the cutting tools, I preferably form these parts in one piece, as illustrated in the drawing. These uprights are adapted to support a cutter spindle thereon which spindle I preferably mount on a cross rail 5 adjustable vertically by means of a screw $5^a$, clamps $5^b$ serving to secure the rail in its adjusted position. In order to provide sufficient space for the tool above the work table and at the same time retain the strength and rigidity of the tool supporting structure, I preferably arch the under side of the rail at $5^c$. The spindle driving mechanism supported on the uprights and rail, as shown generally at 6, includes a shaft $6^a$ extending along the rail to the cutter spindles, the lever $6^b$ being adapted to shift a driving belt (not shown). The uprights and the mechanism supported thereby are adjustable horizontally on the ways $1^a$ by means of a screw 7 journaled into a bracket $7^a$ on the base and the uprights are adapted to be clamped in adjusted position by means of bolts $7^b$. The construction just described forms a very solid and substantial support for the cutting tools and such construction in a more general and broader scope forms the subject matter of my copending application, Serial No. 409,884, filed Sept. 13, 1920, the illustration and claims herein being limited to the specific construction having a vertical cutter spindle mounted therein. This cutter spindle, as illustrated, is mounted in a gear box 8 preferably formed integrally on the rail 5 and provided with a removable cover plate $8^a$.

In performing cutting operations such as milling, it is desirable to use a spindle and tool conforming in size to the size and character of the work to be performed. It is also desirable that the smaller tool should be operated at a higher speed than the larger tool. In the usual milling and like machines, the same spindle is used in operation whether the work is small or large and of whatever character the work may be. The present invention aims to provide in a single machine a large and small spindle, the former being operable at a relatively slow speed with a large cutter and the latter being adapted to be mounted within the large spindle and rotated at a relatively high speed when the use of a small cutter is desired.

Figure 2:
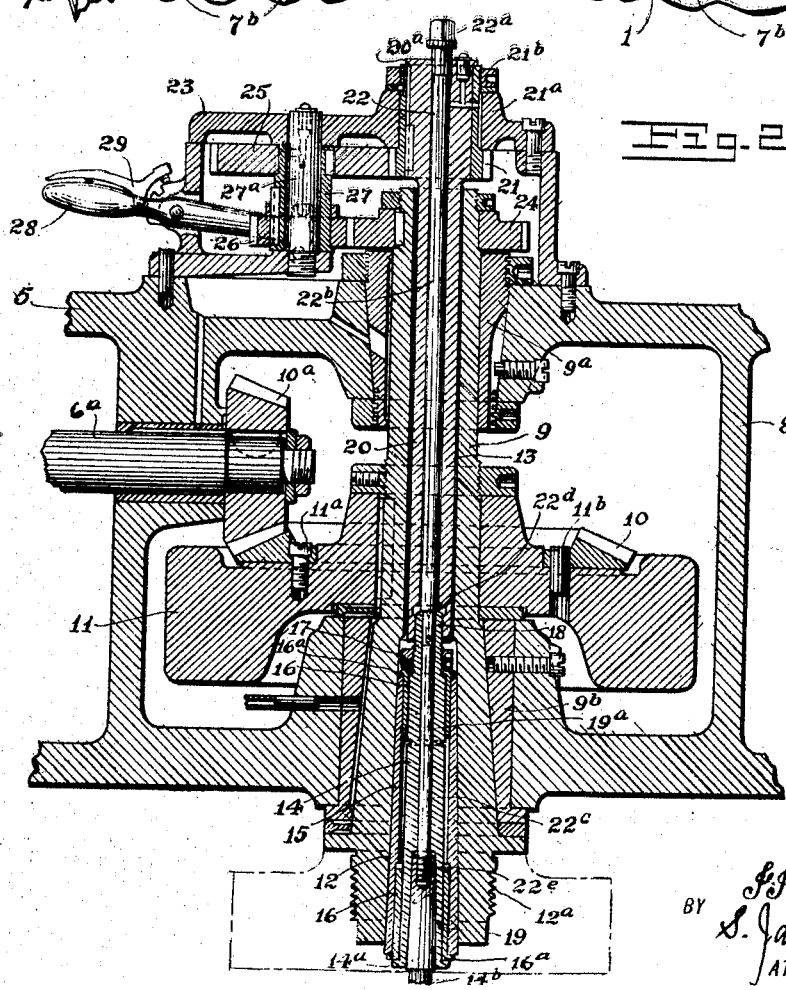
Fig. 2 is a longitudinal section through the cutter spindles and the operating means therefor.

Referring particularly to Fig. 2, 9 represents a large cutter spindle mounted within bearings 9$^a$ and 9$^b$ in the gear box 8. Driving means for this spindle comprises a bevel gear 10 meshing with a bevel gear 10$^a$ on the shaft 6$^a$. As illustrated, I preferably provide a fly wheel 11 on the spindle and secure the spindle driving gear 10 to the fly wheel as by a screw 11$^a$ and pin 11$^b$. The spindle is formed with a socket 12 therein for the reception of the shank of a tool and also with a threaded exterior 12$^a$ for the reception of a tool of another type. A longitudinal opening 13 is formed through the spindle to receive a screw-threaded rod for securing the tool in the socket 12. The mechanism thus far described provides a large spindle adapted to receive a large cutter and to be rotated at a relatively slow speed. When the character of the work is such that a smaller cutter rotatable at a relatively high speed is desired, a smaller spindle mechanism one embodiment of which is now to be described, may be mounted within the large spindle and driven preferably therefrom.

The small and inner spindle mechanism which is adapted to be mounted within the socket 12 of the large and outer spindle comprises the small spindle proper 14, taper sleeve 15 and flanged bushings 16. The mechanism is assembled, as shown, with the spindle rotatably mounted within the bushings 16 at each end of the sleeve. The flanges 16$^a$ on the bushings are adapted to engage the ends of the sleeve. Also a flange 14$^a$ on the outer end of the spindle 14 is adapted to engage the outer bushing and check nuts 17 are threaded onto the inner end of the spindle and engage the inner bushing whereby the spindle mechanism as thus far described is held in assembled relation. The inner end 18 of the spindle 14 is squared to receive a driving member and the outer end is provided with a tool socket 19 therein, a longitudinal opening 19$^a$ extending through the spindle for the reception of a tool-securing rod to be described. This mechanism as thus assembled is adapted to be chucked into the outer spindle socket 12.

As heretofore stated, I preferably drive the inner spindle from the outer spindle and at a higher speed, and the following described mechanism serves as one convenient means of performing such function. The driving member for the smaller spindle preferably comprises a tubular shaft 20 within the opening 13, the lower end of such shaft being squared to fit the spindle at 18. The upper end of the shaft is splined within a driving gear 21 held rotatably within a bearing 21$^a$ by means of a check nut 21$^b$. The shaft 20 is held in driving position by its own weight, an annular flange 20$^a$ thereon serving to keep the shaft in proper position. The shaft may be lifted upward and outward by engaging the bottom thereof through the socket 12. A tool-securing rod 22 having a squared flanged portion 22$^a$, an extended relieved portion 22$^b$, a smaller portion 22$^c$ extends through the shaft 20 and the spindle 14 and is adapted to threadedly engage the tool 14$^b$ to secure the same within the socket 19. The relieving of the portion 22$^b$ of the rod 22 provides for easy operation thereof within the shaft 20, the unrelieved upper end of the rod within the opening prevents looseness and chatter of the rod within the opening and the shoulder 22$^d$ thereof in connection with the screw threads 22$^e$ serves to hold the tool in place in the socket 19. In removing the spindle mechanism, the rod 22 is unscrewed and a tapping on the head 22$^a$ thereof serves to drive the spindle mechanism from the socket 12.

The driving mechanism between the outer spindle 9 and the inner spindle 14 preferably comprises gearing housed as at 23. This gearing comprises the inner spindle drive gear 21 having the inner spindle removably splined therein, a second gear 24 on the outer spindle and gears 25 and 26 on the bushing 27 mounted on a short shaft 27$^a$. These two latter gears mesh respectively with gears 21 and 24 and, as illustrated, the relative sizes of the gears are such that the inner spindle is rotated at a relatively high speed by the rotation of the outer spindle. The gear 26 is splined to the bushing 27. A shifting handle 28 serves to slide such gear upward to an inoperative position and a latch 29 on the handle serves as a convenient means to hold the gear so disengaged.

For certain classes of work both the outer and inner spindles may have cutters secured thereto and operated simultaneously. In such case the large cutter would in the particular construction herein disclosed, be secured to the threads 12$^a$ as shown in dot and dash lines on the drawing. The two cutters used may be of any relative size desired.

From the above description it is thought that the invention will be clearly understood. Fig. 2 of the drawing shows the spindle mechanism assembled for operation with the smaller and inner spindle. When it is desired to operate with a large cutter in the large outer spindle the entire inner spindle mechanism and its driving means are removed. This is done by unscrewing the screw rod 22 from engagement with the small tool 14b and tapping the rod to remove the spindle assembly from the socket 12. The tubular shaft 20 and the parts therein may be lifted bodily from the opening 13 in the outer spindle. The socket 12 and the opening 13 are adapted respectively to receive a tool shank and its securing means therein.

What I claim is:

1. In a milling machine, the combination of a base having horizontal ways thereon, a work table mounted between the ways, an upright mounted on each way, the uprights being permanently connected together and adapted to be adjusted on the ways, clamping means for securing the uprights in adjusted position, a spindle mounted vertically on the uprights over the table, and means for driving the spindle.

2. In a milling machine, the combination of a base having horizontal ways thereon, a work table slidably mounted between the ways, an upright mounted on each way, the uprights being permanently connected together and adapted to be adjusted on the ways transversely of the table movement, a spindle mounted vertically on the uprights over the table, and means for driving the spindle.

3. In a milling machine, the combination of a base having horizontal ways thereon, a work table mounted between the ways, an upright mounted on each way, the uprights being secured together as a unit and adapted to be simultaneously adjusted on the ways, a cutter-supporting rail mounted in the uprights, a spindle mounted vertically in the rail over the table, and means for driving the spindle.

4. In a milling machine, the combination of a base having horizontal ways thereon, a work table extending longitudinally between the ways transversely thereof, an upright mounted on each way, the uprights being secured together as a unit, screw means for adjusting such unit on its ways transversely of the table, a cutter-supporting rail mounted on the uprights, a spindle mounted vertically on the rail over the table, and means for driving the spindle.

5. In a milling machine, the combination of a base having horizontal ways thereon, a work table mounted between the ways, an upright mounted on each way, the uprights being integrally connected together, means for adjusting and clamping the uprights on the ways, a cutter-supporting rail mounted on the uprights, a spindle mounted vertically on the rail over the table, and means for driving the spindle.

6. In a milling machine, the combination of a base having horizontal transverse ways thereon, a work table mounted between the ways, an upright mounted on each way, the uprights being secured together as a unit and adapted to be simultaneously adjusted on the ways transversely of the table, a cutter-supporting rail mounted on the uprights, screw means for adjusting the rail vertically on the uprights, a spindle mounted vertically on the rail over the table, and means for driving the spindle.

7. In a milling machine, the combination of a base, two uprights mounted thereon, a work table between the uprights, the two uprights being adjustable on the base transversely of the table, a cutter-supporting rail mounted on the uprights, the rail being arched upwardly between the uprights, a spindle mounted vertically in laterally immovable bearings on the arched portion of the rail, and means for driving the spindle.

8. In a milling machine, the combination of a base, two connected uprights mounted thereon, means for adjusting the uprights as a unit, a work table between the uprights, a cutter-supporting rail mounted on the uprights, the under side of the rail being arched upwardly between the uprights and over the table, a spindle mounted vertically on the arched portion of the rail, and means for driving the spindle.

9. In a milling machine, the combination of a base, two connected uprights mounted thereon, a work table between the uprights, the uprights being adjustable transversely of the work table, a cutter-supporting rail mounted on the uprights, a gear box on the rail over the table, a spindle mounted vertically in the box, and means for driving the spindle.

10. In a milling machine, the combination of a base, two uprights mounted thereon, a work table between the uprights, a cutter-supporting rail mounted on the uprights, the rail being horizontally adjustable transversely of the table, a gear box integrally formed on the rail over the table, a spindle mounted vertically in the box, and means comprising a horizontal drive shaft extending along the rail for driving the spindle.

11. In a milling machine, the combination of a base, two permanently connected uprights mounted thereon, a work table between the uprights, a cutter-supporting rail mounted on the uprights, the under side of the rail being arched upwardly between the uprights and over the table, a gear box integrally formed on the arched portion of the rail, a spindle mounted vertically in the box, and means comprising a horizontal drive shaft extending along the rail for driving the spindle.

12. Spindle mechanism comprising the combination of a spindle having a central longitudinal opening therethrough, means including a gear on the spindle for driving the same, a smaller spindle rotatably mounted within the said opening, the spindles being adapted to receive cutting tools therein, means coaxial of the spindles for holding a tool in the smaller spindle, means extending coaxially through the larger spindle and operatively connected to the smaller spindle for driving the same, and means for driving the smaller spindle at a faster speed than the larger spindle.

13. Spindle mechanism comprising the combination of a spindle having a central longitudinal opening therethrough, a smaller spindle rotatably mounted within the said opening, the spindles being adapted to receive cutting tools therein, means extending coaxially through the larger spindle for driving the smaller spindle, means within the last mentioned means for securing a tool in the smaller spindle, and means for rotating the spindles at different speeds.

14. Spindle mechanism comprising the combination of a cutter spindle having a central longitudinal opening therethrough, a smaller cutter spindle rotatably mounted within the said opening, a drive gear mounted on each spindle, a second gear on the outer spindle, gearing between the said second gear and the inner spindle drive gear for rotating the inner spindle upon rotation of the outer spindle, and means for readily disengaging the said gearing from the said second gear without disturbing the relative position of the spindles.

15. Spindle mechanism comprising the combination of a cutter spindle having a socket therein at one end and a longitudinal opening extending from the socket to the other end, a smaller cutter spindle rotatably mounted within the said socket and extending into the opening, means extending through the opening and detachably engaging the smaller spindle for rotating the same, the smaller spindle and its rotating means being adapted to be removed and the socket being adapted to receive a cutting tool non-rotatably therein for operation by the outer spindle alone, and means for rotating outer spindle.

16. Spindle mechanism comprising the combination of a cutter spindle having a socket therein at one end and a longitudinal opening extending from the socket to the other end, a spindle bearing within the socket, a smaller cutter spindle rotatably mounted within the said bearing, a drive shaft for the smaller spindle extending through the said opening, means within the said shaft for securing a tool in the smaller spindle, bearing and shaft being adapted to be removed and the socket and opening being adapted to receive a cutting tool and its securing means non-rotatably therein for operation by the outer spindle alone, and means for rotating the spindles.

17. Spindle mechanism comprising the combination of an outer cutter spindle having a socket therein at one end and a longitudinal opening extending from the socket to the other end, a spindle assembly comprising a smaller cutter spindle rotataby mounted and secured in bearings within a sleeve member, such assembly being bodily mounted within the said socket, a drive shaft for the smaller spindle extending through the said opening, the spindle assembly and drive shaft being adapted to be removed and the socket and opening being adapted to receive a cutting tool and its securing means non-rotatably therein for operation by the outer spindle alone, and means for rotating the spindles.

18. Spindle mechanism comprising the combination of a cutter spindle having a socket therein at one end and a longitudinal opening extending from the socket to the other end, a smaller cutter spindle rotatably mounted within the said socket, a tubular drive shaft extending through the said opening and operatively engaging the smaller spindle, a tool-securing rod extending through the said tubular shaft and engaging the tool in the smaller spindle, the smaller spindle and its cooperating parts being adapted to be removed and the socket being adapted to receive a cutting tool non-rotatably therein for operation by the outer spindle alone, and means for rotating the spindles.

19. In a milling machine, the combination of a base, a work table mounted thereon, a cutter spindle mechanism vertically mounted over the table and comprising a cutter spindle having a central longitudinal opening therethrough, the table and spindle mechanism being relatively bodily movable transversely of the spindle mechanism during the cutting operation, a smaller cutter spindle rotatably mounted within the said opening, the spindles being adapted to receive milling cutters therein, and means for rotating the spindles at different speeds.

20. In a milling machine, the combination of a base, a work table mounted thereon, a cutter spindle mechanism vertically mounted over the table and comprising a cutter spindle having a central longitudinal opening therethrough, the table and spindle mechanism being relatively bodily movable transversely of the spindle mechanism during the cutting operation, a smaller cutter spindle rotatably mounted within the said opening, the spindles being adapted to receive milling cutters therein, and means for rotating the spindles at different speeds in the same direction.

21. In a milling machine, the combination of a base, a work table mounted thereon, a cutter spindle mechanism vertically mounted over the table and comprising a cutter spindle having a central longitudinal opening therethrough, the table and spindle mechanism being relatively bodily movable transversely of the spindle mechanism during the cutting operation, a smaller cutter spindle rotatably mounted within the said opening, the spindles being adapted to receive milling cutters therein, means for rotating the outer spindle, and means auxiliary to the outer spindle and the said first means for rotating the inner spindle.

22. In a milling machine, the combination of a base, a work table mounted thereon, a cutter spindle mechanism vertically mounted over the table and comprising a cutter spindle having a central longitudinal opening therethrough, the table and spindle mechanism being relatively bodily movable transversely of the spindle mechanism during the cutting operation, a smaller cutter spindle rotatably mounted within the said opening, the spindles being adapted to receive milling cutters therein, a drive gear mounted on each spindle, a second gear on the outer spindle, and gearing between the said second gear and the inner spindle drive gear for rotating the inner spindle upon rotation of the outer spindle.

23. In a milling machine, the combination of a base, a work table mounted thereon, a cutter spindle mechanism vertically mounted over the table and comprising a cutter spindle having a central longitudinal opening therethrough, the table and spindle mechanism being relatively bodily movable transversely of the spindle mechanism during the cutting operation, a smaller cutter spindle rotatably mounted within the said opening, the spindles being adapted to receive milling cutters therein, a drive gear mounted on each spindle, a second gear on the outer spindle, gearing between the said second gear and the inner spindle drive gear for rotating the inner spindle upon rotation of the outer spindle, and means for disengaging the said inner spindle drive gearing.

24. In a milling machine, the combination of a base, a work table slidably mounted thereon, a cutter spindle mechanism vertically mounted over the table and comprising a cutter spindle having a socket therein, a smaller cutter spindle rotatably mounted within the said socket, the smaller spindle being adapted to be removed and the socket being adapted to receive a milling tool non-rotatably therein for operation by the outer spindle alone, and means for rotating the spindles.

25. In a milling machine, the combination of a base, a work table slidably mounted thereon, a cutter spindle mechanism vertically mounted over the table and comprising a cutter spindle having a socket therein at one end and a longitudinal opening extending from the socket to the other end, the socket being adapted to receive a milling tool rotatably therein, a tubular driving shaft extending through the said opening and adapted to operatively engage the tool, the mechanism being adapted to operate with a large tool non-rotatably mounted in the socket or with a small tool rotatably mounted within the socket and driven by the tubular shaft, and means for rotating the spindle and the tubular shaft at different speeds.

26. In a milling machine, the combination of a base, a work table slidably mounted thereon, a cutter spindle mechanism vertically mounted over the table and comprising two concentric cutter spindles, a milling cutter secured to each spindle, and means for rotating the inner and outer spindles at relatively high and low speeds respectively.

27. In a milling machine, the combination of a base, a work table slidably mounted thereon, a cutter spindle mechanism vertically mounted over the table and comprising a cutter spindle having a socket therein, and tool securing means on the exterior thereof, a small milling cutter rotatably mounted within the socket, a relatively large milling cutter mounted on the spindle by the said securing means, and means for rotating the small and large cutters at relatively high and low speeds respectively.

In testimony whereof, I hereto affix my signature.

JERRY J. LA DUCER.